(12) United States Patent
Campbell et al.

(10) Patent No.: US 9,117,029 B2
(45) Date of Patent: Aug. 25, 2015

(54) DEFERRED EVALUATION AND PRESENTATION OF A CUSTOM DIAGNOSTIC ANALYSIS

(71) Applicant: The MathWorks, Inc., Natick, MA (US)

(72) Inventors: Andrew T. Campbell, Medway, MA (US); David M. Saxe, Stow, MA (US); Gregory V. Aloe, Jamaica Plain, MA (US); Jeremy B. Nersasian, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 264 days.

(21) Appl. No.: 13/705,578

(22) Filed: Dec. 5, 2012

(65) Prior Publication Data

US 2014/0157242 A1      Jun. 5, 2014

(51) Int. Cl.
*G06F 9/44*        (2006.01)
*G06F 11/36*       (2006.01)

(52) U.S. Cl.
CPC .................................. *G06F 11/3692* (2013.01)

(58) Field of Classification Search
None
See application file for complete search history.

(56) References Cited

U.S. PATENT DOCUMENTS

| | | | |
|---|---|---|---|
| 7,454,659 B1* | 11/2008 | Gaudette et al. | 714/33 |
| 7,562,359 B1* | 7/2009 | Andersen | 717/175 |
| 2008/0021951 A1* | 1/2008 | Lurie et al. | 709/202 |
| 2008/0235611 A1* | 9/2008 | Fraley et al. | 715/772 |
| 2009/0019416 A1* | 1/2009 | Chugh et al. | 716/18 |
| 2009/0070738 A1* | 3/2009 | Johnson | 717/106 |
| 2011/0029960 A1* | 2/2011 | Cimadamore et al. | 717/141 |
| 2011/0167425 A1* | 7/2011 | Lurie et al. | 718/102 |

* cited by examiner

*Primary Examiner* — Don Wong
*Assistant Examiner* — Roberto E Luna
(74) *Attorney, Agent, or Firm* — Harrity & Harrity, LLP

(57) ABSTRACT

A device receives code generated via a technical computing environment (TCE), performs a test on the code to generate a test result, and generates test information based on the performance of the test on the code. The device outputs or stores the test result, and receives, based on the test result, a request for a diagnostic analysis of the code. The device performs, based on the request, the test information, and at least one diagnostic, a diagnostic analysis of the code to generate a diagnostic result, and outputs or stores the diagnostic result.

20 Claims, 10 Drawing Sheets

DEFERRED EVALUATION AND PRESENTATION OF A CUSTOM DIAGNOSTIC ANALYSIS

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements.

A technical computing environment (TCE) may provide a computing environment that allows users to perform tasks related to disciplines, such as, but not limited to, mathematics, science, engineering, medicine, business, etc., more efficiently than if the tasks were performed in another type of computing environment, such as an environment that requires the user to develop code in a conventional programming language, such as C++, C, Fortran, Pascal, etc. In one example, a TCE may include a dynamically-typed programming language (e.g., the M language, a MATLAB® language, a MATLAB-compatible language, a MATLAB-like language, etc.) that can be used to express problems and/or solutions in mathematical notations.

Code generated by the TCE may be tested, by a diagnostic system, to determine whether the code will function properly (e.g., when executed). When the code fails a test, typical diagnostic systems output a diagnostic string that includes very limited information (e.g., a static explanation of the failure). Such diagnostic systems do not enable a user (e.g., a tester) to perform a specific diagnostic analysis to obtain more detailed information about the failure of the code. Other diagnostic systems may automatically perform the specific diagnostic analysis, even when the tester does not want more detailed information about the failure. Performance of the specific diagnostic analysis may consume time and costly computing resources.

Overview

Systems and/or methods described herein may defer evaluation and presentation of a custom diagnostic analysis. In one example, the systems and/or methods may provide a rich diagnostic infrastructure that is flexible and customizable. The systems and/or methods may enable a tester to create a custom diagnostic that performs an in-depth and complete diagnostic analysis of a state of program code, when requested by the tester. For example, the tester may request the diagnostic analysis of the code when the code fails or when the code passes (i.e., does not fail). Thus, the systems and/or methods may enable the diagnostic analysis to be deferred until the tester or a test framework requests the diagnostic analysis. Such an arrangement may prevent the diagnostic analysis from unnecessarily consuming time and costly computing resources.

Figure 1:
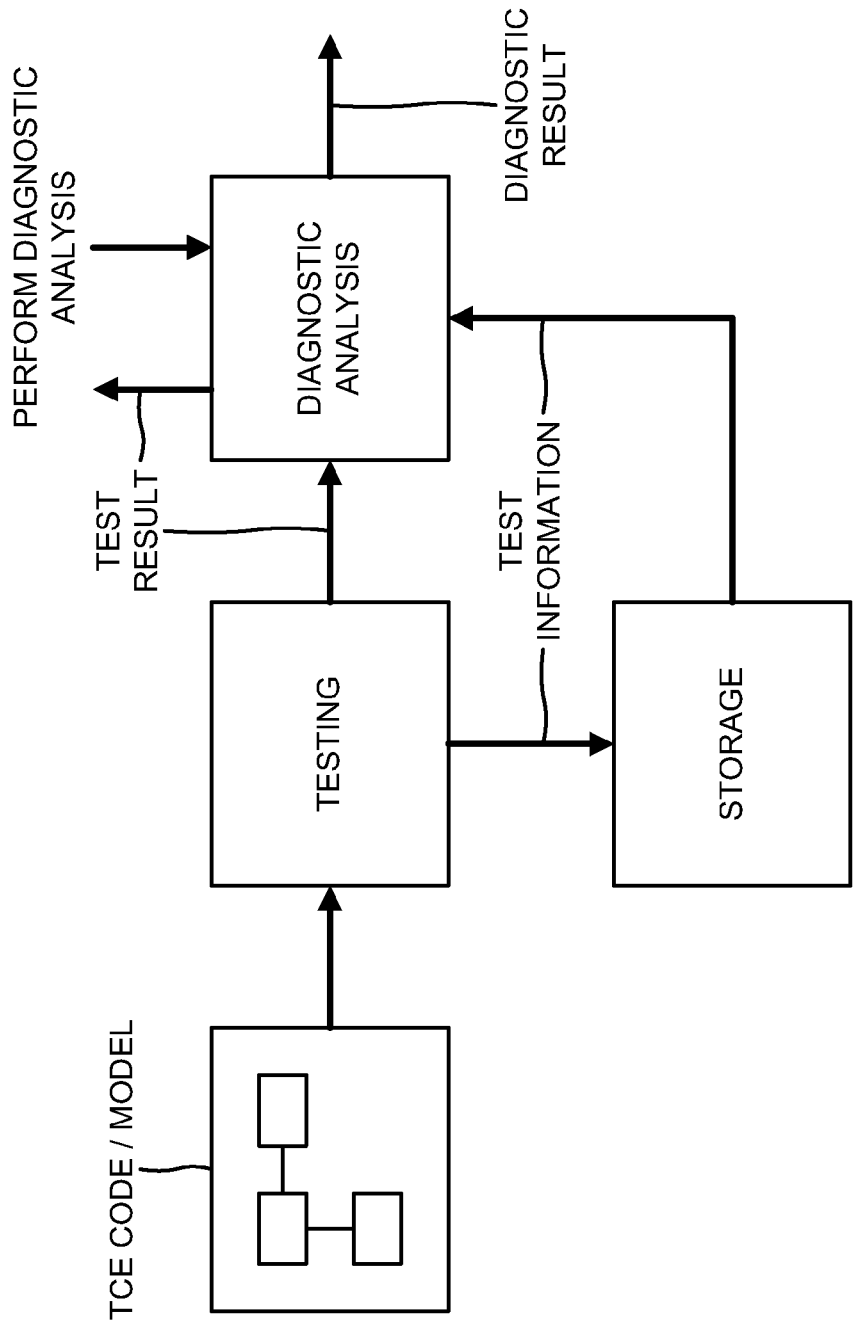
FIG. 1 is a diagram of an overview of an example implementation described herein.

FIG. 1 is a diagram of an overview of an example implementation described herein. As shown in FIG. 1, a computing environment, such as a technical computing environment (TCE), may include a testing component, a storage component, and a diagnostic analysis component. The testing component may receive code generated by the TCE, and may test the code to determine whether the code will function properly. The storage component may store information generated during performance of the test. The diagnostic analysis component may perform a diagnostic analysis on the code, when requested by a tester.

As further shown in FIG. 1, the testing component may receive code generated by the TCE. The TCE code may include text-based code that may require further processing to execute, binary code that may be executed, text files that may be executed in conjunction with other executables, etc. In one example, the TCE code may include a model that may need to be tested by the testing component.

The testing component may receive a test to perform on the TCE code. In one example, the test may include one or more test application programming interfaces (APIs) that perform particular tests on one or more portions of the TCE code. The testing component may perform the test on the TCE code to generate a test result. In one example, the test result may include an indication (e.g., a diagnostic string) that provides a static explanation of whether one or more portions of the TCE code passed or failed the test. During performance of the test on the TCE code, the testing component may generate test information, and may provide the test information to the storage component for storage. In one example, the test information may include states of the TCE code during execution of the portions of the TCE code. For example, the testing component may capture a state of a TCE model when the TCE model experiences a failure, and may store this state information in the storage component.

The testing component may output (e.g., display to the tester) and/or may store the test result. Alternatively, or additionally, the testing component may provide the test result to the diagnostic analysis component. The diagnostic analysis component may receive the test result, and may provide (e.g., display) the test result to the tester. Based on the test result, the tester may or may not decide to perform a diagnostic analysis on the TCE code. If the tester decides to perform the diagnostic analysis on the TCE code, the tester may provide a request to perform the diagnostic analysis to the diagnostic analysis component.

If the diagnostic analysis component receives the request to perform the diagnostic analysis, the diagnostic analysis component may retrieve the test information from the storage component. The diagnostic analysis component may perform, based on the request and the test information, a diagnostic analysis of the TCE code to generate a diagnostic result. In one example, the diagnostic result may include the diagnostic string, an in-depth analysis of a failure in the TCE code, active processes during occurrence of the failure in the TCE code, etc. The diagnostic analysis component may output (e.g., display to the tester) and/or may store the diagnostic result.

The terms "code" and "program code," as used herein, are to be used interchangeably and are to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

Example Environment Arrangement

Figure 2:
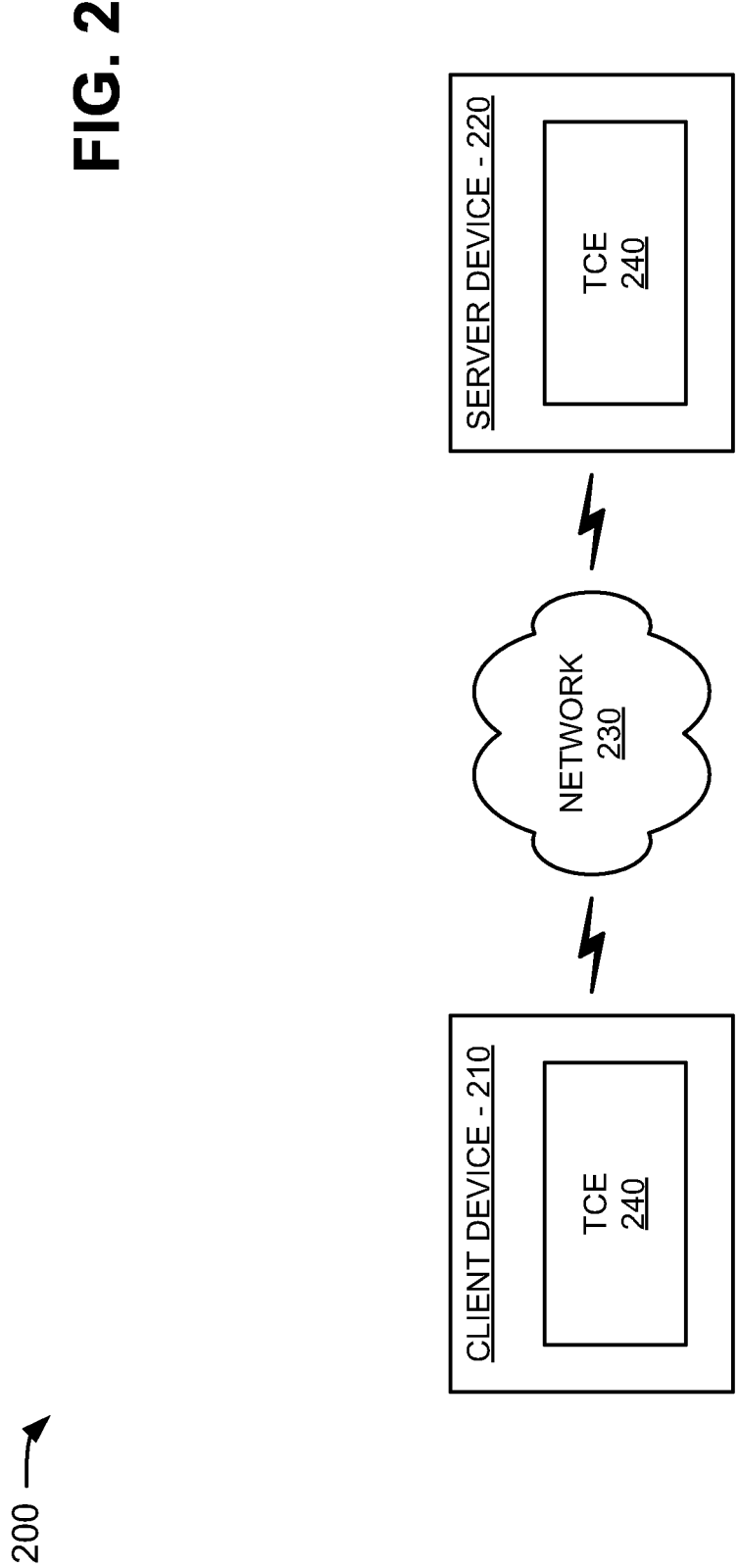
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM;

Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
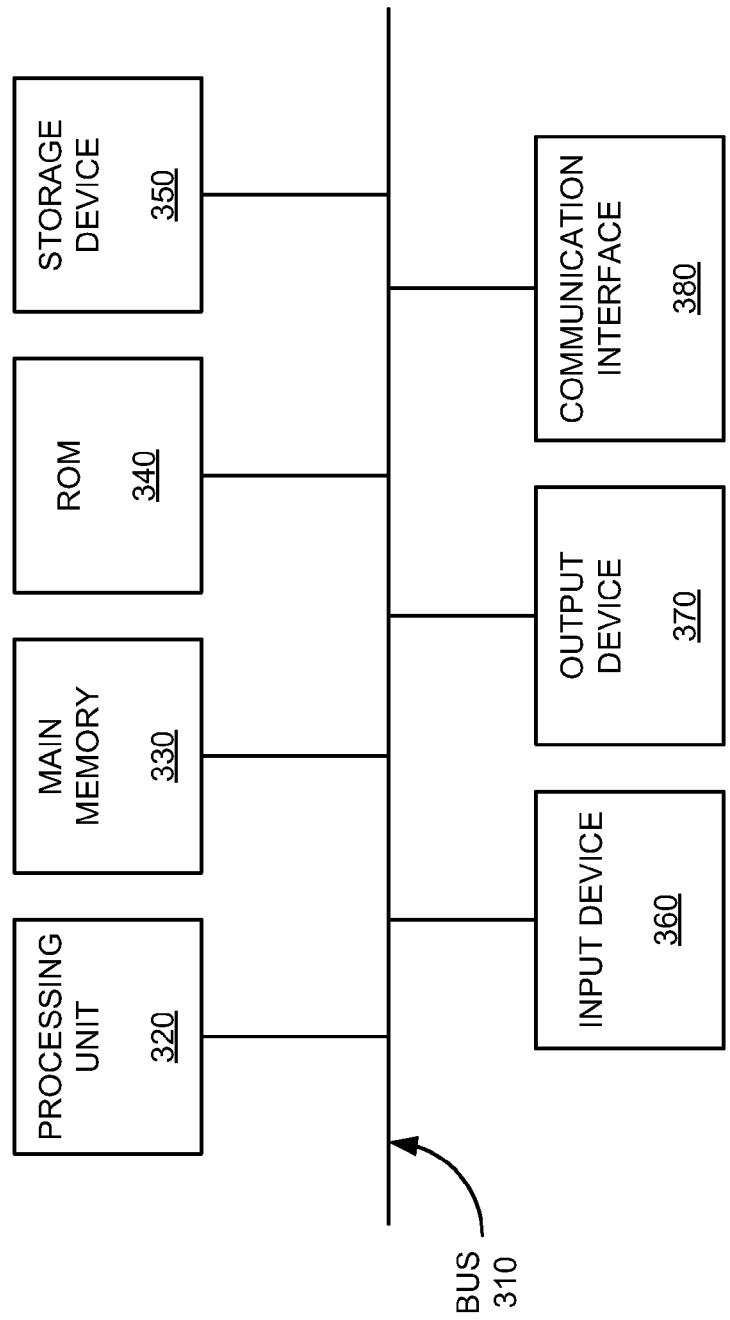
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
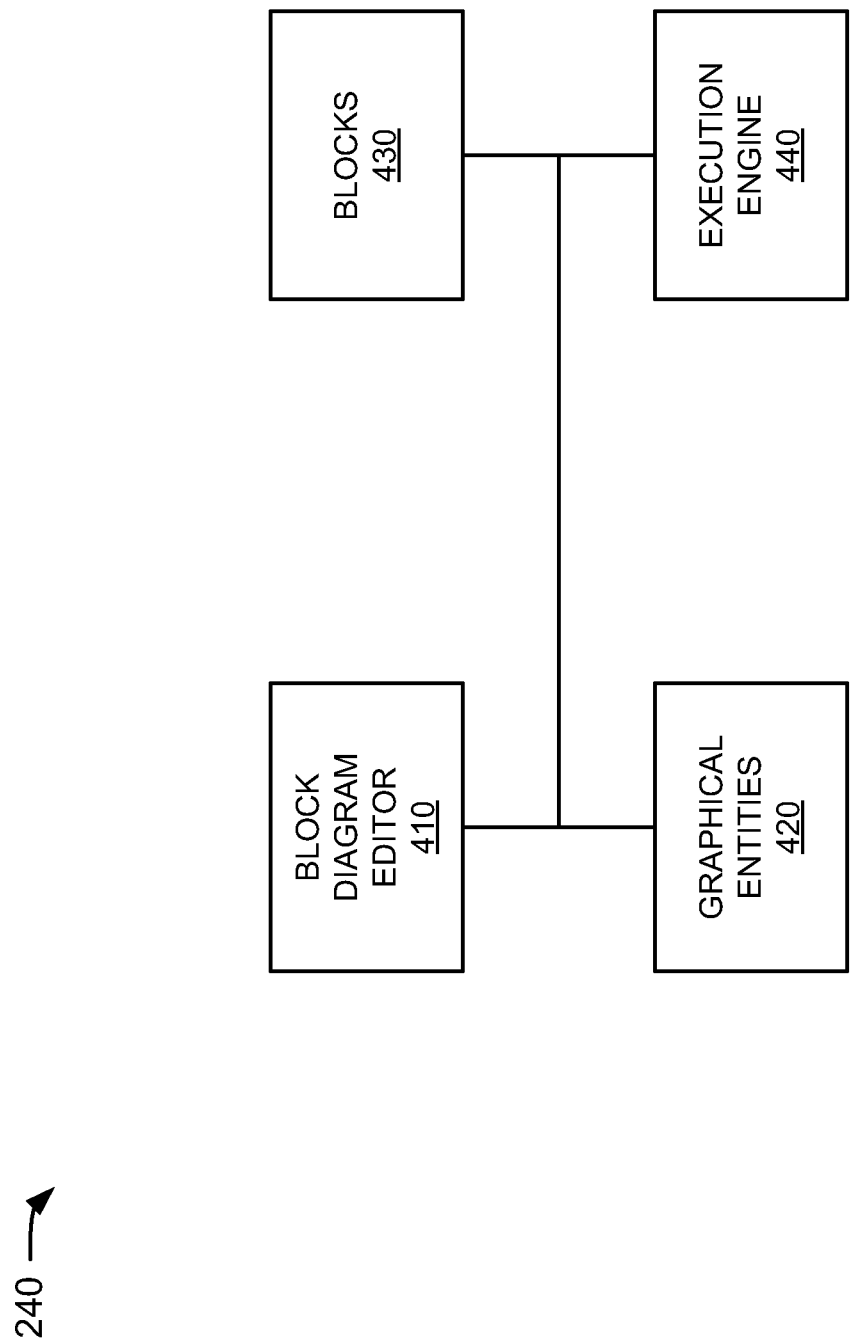
FIG. 4 is a diagram of example functional components of a technical computing environment (TCE) that may be used by one or more of the devices of the environment depicted in FIG. 2.

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

Graphical models may include entities with relationships between the entities, and the relationships and/or the entities may have attributes associated with them. The entities my include model elements such as blocks 430 and ports. The relationships may include model elements such as lines (e.g., connector lines) and references. The attributes may include model elements such as value information and meta information for the model element associated with the attributes. Graphical models may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

A sample time may be associated with the elements of a graphical model. For example, a graphical model may include a block (e.g., block 430) with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block (e.g., block 430) with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block (e.g., block 430) with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Technical Computing Environment Operations

Figure 5:
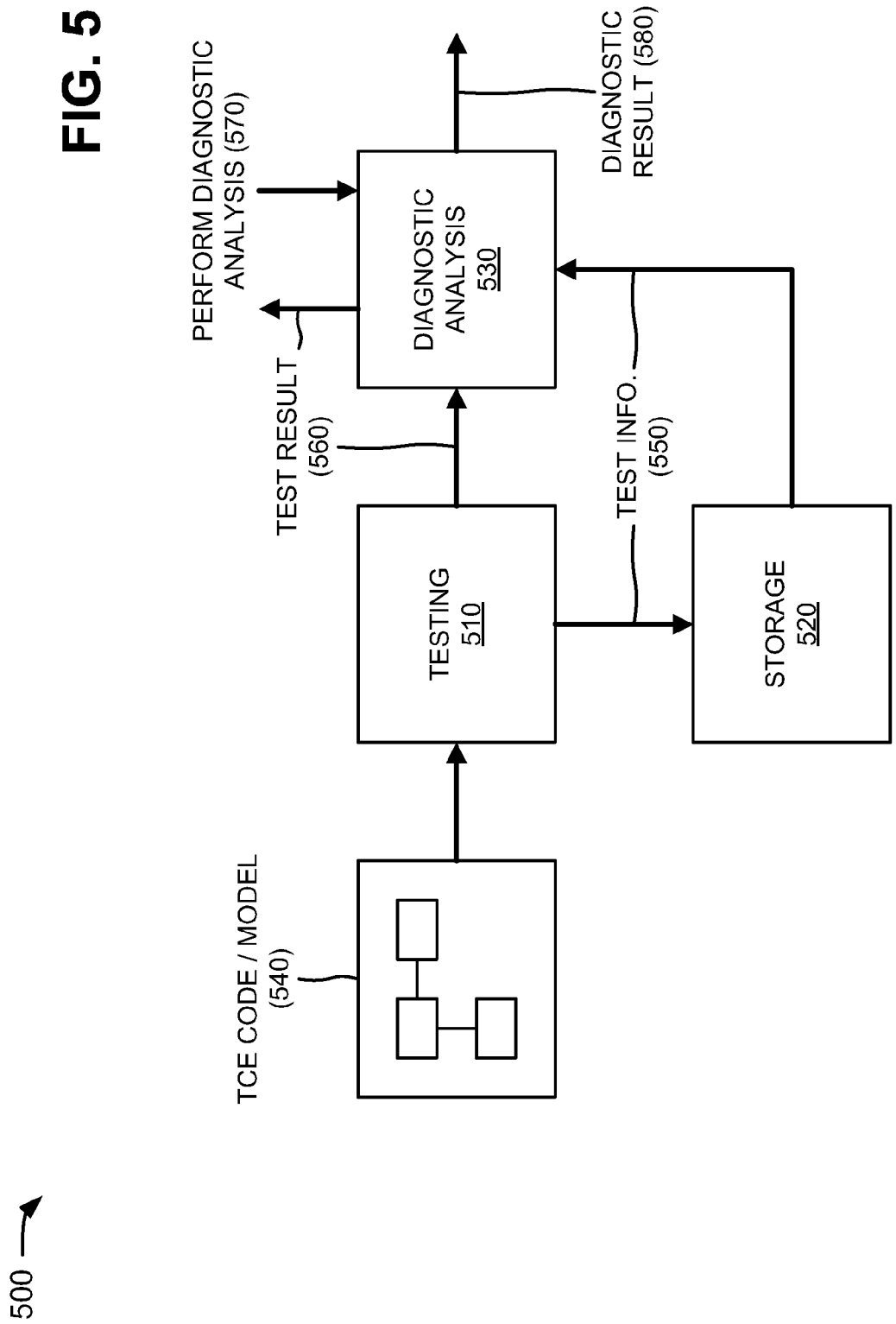
FIG. 5 is a diagram of example operations capable of being performed by the TCE.

FIG. 5 is a diagram of example operations 500 capable of being performed by TCE 240. TCE 240 may include the features described above in connection with, for example, one or more of FIGS. 1-4. As illustrated in FIG. 5, TCE 240 may include a testing component 510, a storage component 520, and a diagnostic analysis component 530. The functions described in connection with testing component 510, storage component 520, and diagnostic analysis component 530 may be performed by one or more components of device 300 (FIG. 3) and/or by one or more devices 300.

As further shown in FIG. 5, testing component 510 may receive code 540 generated by TCE 240. TCE code 540 may include text-based code that may require further processing to execute, binary code that may be executed, text files that may be executed in conjunction with other executables, etc. In one example, TCE code 540 may include one or more models that may need to be tested by testing component 510.

Testing component 510 may receive (e.g., from a tester) a test to perform on TCE code 540. Alternatively, or additionally, testing component 510 may include one or more pre-configured tests for TCE code 540, and the tester may select one of the pre-configured tests. In one example, the test may include one or more test APIs that perform particular tests on one or more portions of TCE code 540. Testing component 510 may perform the test on TCE code 540 to generate a test result 560. In one example, test result 560 may include an indication (e.g., a diagnostic string) that provides a static explanation of whether one or more portions of TCE code 540 passed or failed the test. During performance of the test on TCE code 540, testing component 510 may generate test information 550, and may provide test information 550 to storage component 520. Storage component 520 may receive and store test information 550. In one example, test information 550 may include states of TCE code 540 during execution of the portions of TCE code 540, information associated with screen shots of the executing TCE code 540, information associated with failures of TCE code 540, etc. For example, testing component 510 may capture a state of a model when the model experiences a failure, and may store this state information in storage component 520.

Testing component 510 may output (e.g., display to the tester) and/or may store test result 560 (e.g., in storage component 520). Alternatively, or additionally, testing component 510 may provide test result 560 to diagnostic analysis component 530. Diagnostic analysis component 530 may receive test result 560, and may provide (e.g., display) test result 560 to the tester. Based on test result 560 and/or other factors, the tester may or may not decide to perform a diagnostic analysis on TCE code 540. For example, if test result 560 indicates that TCE code 540 failed the test, the tester may request performance of the diagnostic analysis so that the tester may identify problem(s) causing the failure and/or to aid in a debugging process. Alternatively, the tester may configure the test framework to not perform the diagnostic analysis during failures of TCE code 540. Alternatively, if test result 560 indicates that TCE code 540 passed the test, the tester may request performance of the diagnostic analysis when the tester wants to verify that the diagnostic analysis executes correctly. If the tester decides to perform the diagnostic analysis on TCE code 540, the tester may provide a request 570 to perform the diagnostic analysis to diagnostic analysis component 530.

If diagnostic analysis component 530 receives request 570 to perform the diagnostic analysis, diagnostic analysis component 530 may retrieve test information 550 from storage component 520. Diagnostic analysis component 530 may perform, based on request 570 and test information 550, a diagnostic analysis of TCE code 540 to generate a diagnostic result 580. In one example, diagnostic result 580 may include a diagnostic string, an in-depth analysis of a failure in TCE code 540, active processes during occurrence of the failure in TCE code 540, a screen shot of the executing TCE code 540 during the failure, information associated with the failure, etc. Diagnostic analysis component 530 may output (e.g., display to the tester) and/or may store diagnostic result 580.

In one example implementation, diagnostic analysis component 530 may receive a diagnostic class for the diagnostic analysis. The diagnostic class may include an array of one or more (e.g., multiple) diagnostics to perform on TCE code 540. For example, the diagnostic class may include particular syntax (e.g., diagnostic.join(diag1, diag2, . . . , diagn)) for the array, where diag1 through diagn may include strings, function handles, and/or diagnostic instances. Diagnostic analysis component 530 may perform the multiple diagnostics on TCE code 540 to generate multiple diagnostic results (e.g., similar to diagnostic result 580). Diagnostic analysis component 530 may output (e.g., display to the tester) and/or may store the multiple diagnostic results.

Alternatively, or additionally, diagnostic analysis component 530 may enable a tester to specify diagnostics that are relevant to a particular verification point of TCE code 540. The specific diagnostics may include string descriptions and multiple arbitrary diagnostics. However, diagnostic analysis component 530 may ensure that the expense, associated with execution of the arbitrary diagnostics by computing resources, is incurred only when the tester requests the output of the arbitrary diagnostics.

Diagnostic analysis component 530 may provide a qualification API to the tester. The qualification API may include a set of verification utilities for use in automated testing of TCE code 540. The qualification API may include qualification types (e.g., verifications, assertions, fatal assertions, assumptions, etc.) and methods that determine whether TCE code 540 passes or fails a qualification. The qualification API methods may allow an optional input argument, such as, for example, a string, a function handle, a subclass of a diagnostic interface base class, etc. When a string is provided as the input argument, diagnostic analysis component 530 may utilize a simple string description as diagnostic result 580. A function handle is a pointer to a specific instance of a function. When a function handle is provided as the input argument, diagnostic analysis component 530 may provide, as diagnostic result 580, output that is displayed to the user upon execution of the function handle.

When a subclass of a diagnostic interface base class is provided as the input argument, diagnostic analysis component 530 may invoke abstract diagnostic methods at a particular time. The diagnostic methods may include obtaining screen shots of the executing TCE code 540, saving state associated with models at the point of the failure, querying a status of a device on which TCE code 540 is executing, etc. Whenever a test occurs, regardless of whether the test of TCE code 540 passes or fails, diagnostic analysis component 530 may make the diagnostic methods available to the tester. However, the diagnostic methods may not be invoked by diagnostic analysis component 530 until the tester requests invocation of the diagnostic methods.

Although FIG. 5 shows example operations capable of being performed by TCE 240, in other implementations, TCE 240 may perform fewer operations, different operations, and/or additional operations than depicted in FIG. 5. Alternatively, or additionally, one or more components of FIG. 5 may perform one or more other tasks described as being performed by one or more other components of FIG. 5.

Example Diagnostic Analysis Component Operations

Figure 6:
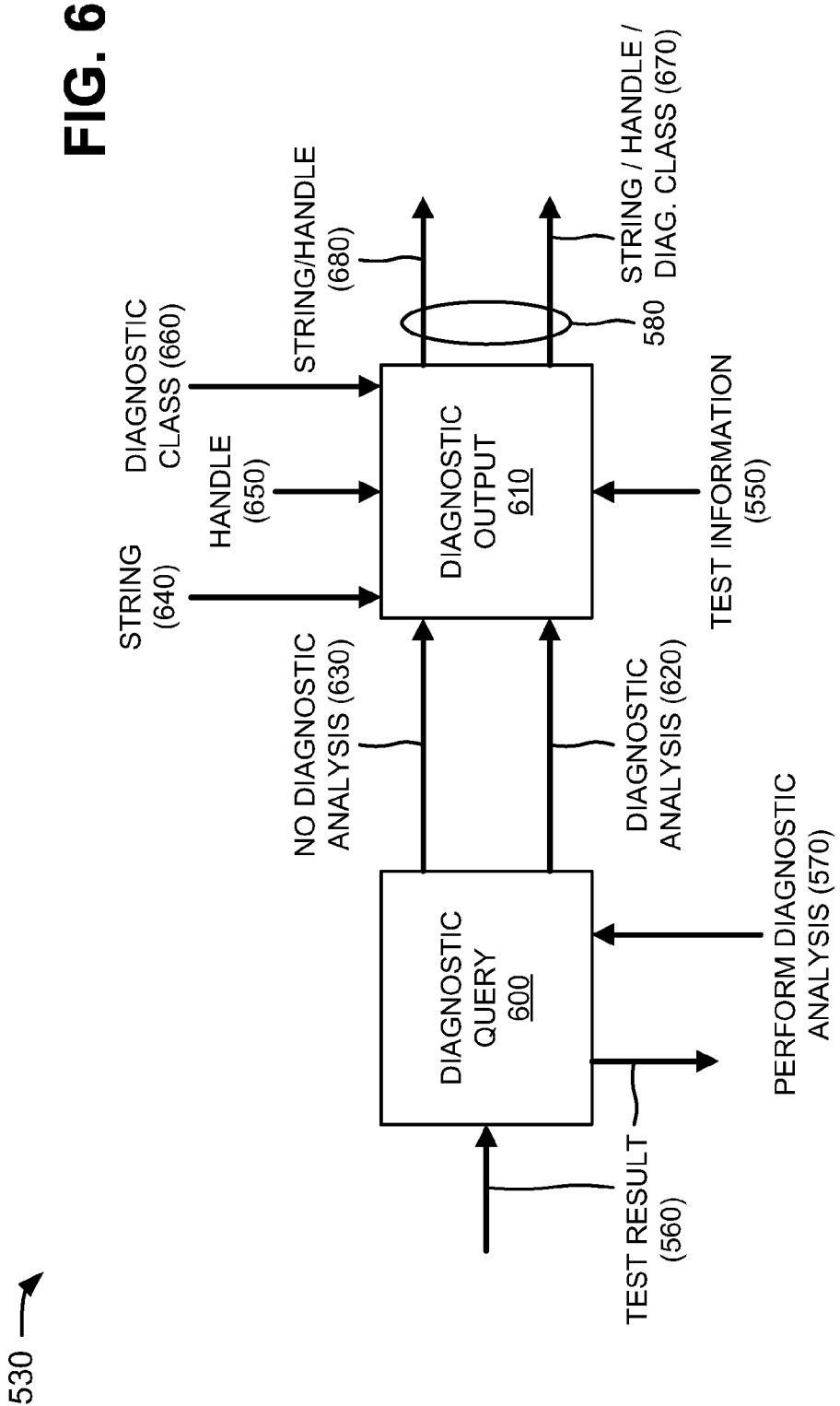
FIG. 6 is a diagram of example functional components of a diagnostic analysis component of the TCE.

FIG. 6 is a diagram of example functional components of diagnostic analysis component 530 (FIG. 5). The functions described in connection with diagnostic analysis component 530 may be performed by one or more components of device 300 (FIG. 3) and/or by one or more devices 300. As shown in FIG. 6, diagnostic analysis component 530 may include a diagnostic query component 600 and a diagnostic output component 610.

Diagnostic query component 600 may receive test result 560, and may provide (e.g., display) test result 560 to the tester. Based on test result 560, the tester may or may not decide to perform a diagnostic analysis on TCE code 540. If the tester decides to perform the diagnostic analysis on TCE code 540, the tester may provide request 570 to perform the diagnostic analysis to diagnostic query component 600. If request 570 is received, diagnostic query component 600 may provide, to diagnostic output component 610, an indication 620 to perform the diagnostic analysis. If request 570 is not received, diagnostic query component 600 may provide, to diagnostic output component 610, an indication 630 to not perform the diagnostic analysis.

Diagnostic output component 610 may receive indication 620 to perform the diagnostic analysis or indication 630 to not perform the diagnostic analysis. Diagnostic output component 610 may receive test information 550, a request 640 for a string, a request 650 for a handle, and/or a request 660 for a diagnostic class. Request 640 may include information requesting a diagnostic string that provides a static explanation of a failure of TCE code 540. Request 650 may include information requesting output that is displayed to the user upon execution of a function handle. Request 660 may include information requesting abstract diagnostic methods at a diagnostic reference time.

If diagnostic output component 610 receives indication 620, diagnostic output component 610 may perform, based on test information 550 and requests 640-660, a diagnostic analysis on TCE code 540 to generate diagnostic result 580. In such a situation, diagnostic result 580 may include a string, a handle, and a diagnostic class, as indicated by reference number 670. The string may include a diagnostic string that provides a static explanation of a failure of TCE code 540. The handle may include an output that is displayed to the user upon execution of a function handle. The diagnostic class may include an in-depth analysis of the failure of TCE code 540, screen shots of the executing TCE code 540, state information associated with models at the point of the failure, a status of a device on which the TCE code 540 is executing, etc.

If diagnostic output component 610 receives indication 630, diagnostic output component 610 may not perform a diagnostic analysis on TCE code 540. Alternatively, if diagnostic output component 610 receives indication 630, diagnostic output component 610 may still perform, based on test information 550 and requests 640 and 650, a diagnostic analysis on TCE code 540 to generate diagnostic result 580. In such a situation, diagnostic result 580 may include a string and a handle, as indicated by reference number 680. The string may include a diagnostic string that provides a static explanation of a failure of TCE code 540. The handle may include an output that is displayed to the user upon execution of a function handle.

Although FIG. 6 shows example functional components of diagnostic analysis component 530, in other implementations, diagnostic analysis component 530 may include fewer functional components, different functional components, differently arranged functional components, and/or additional functional components than depicted in FIG. 6. Alternatively, or additionally, one or more functional components of diagnostic analysis component 530 may perform one or more other tasks described as being performed by one or more other functional components of diagnostic analysis component 530.

Figure 7:
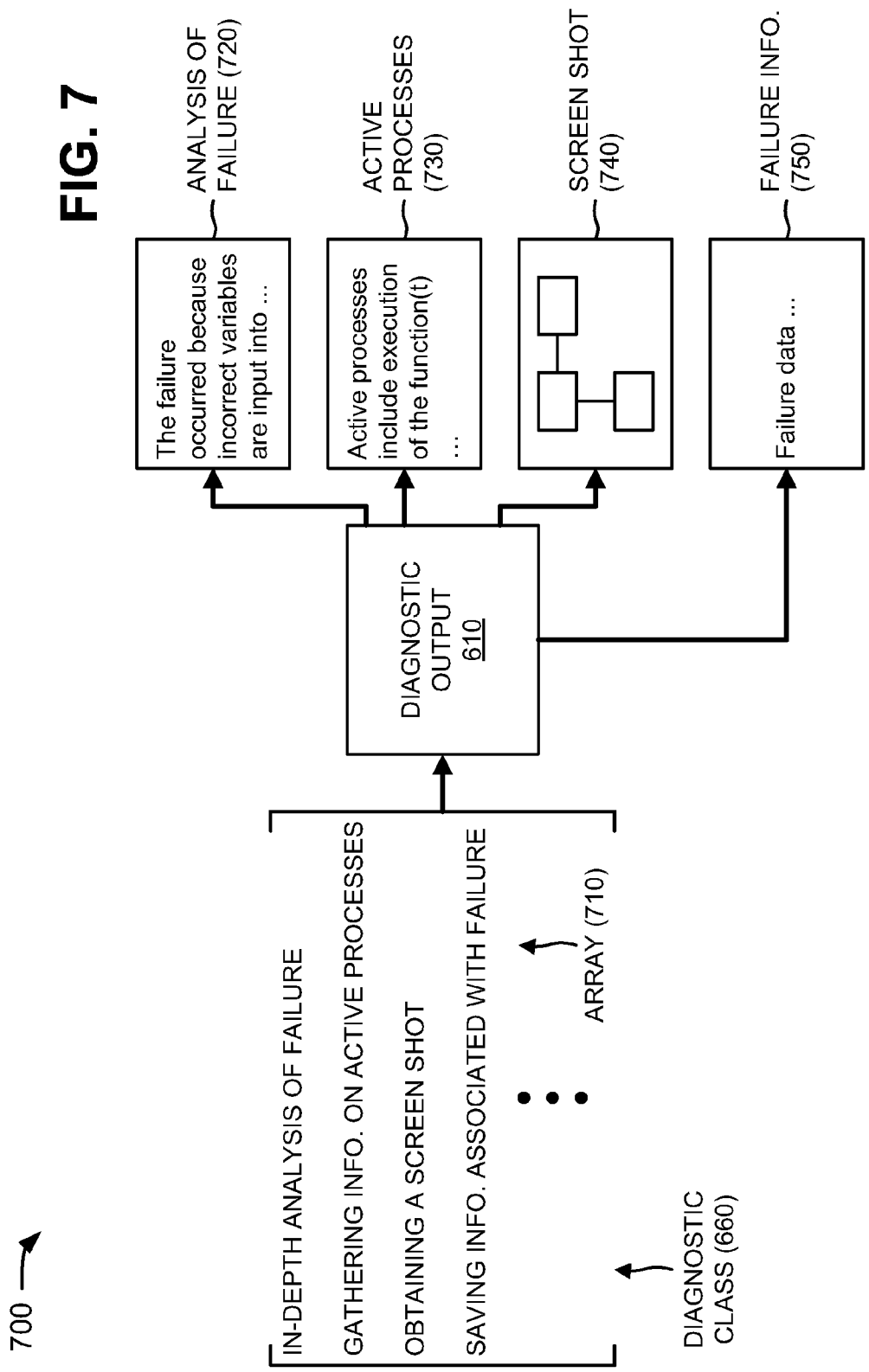
FIG. 7 is a diagram of example operations capable of being performed by the diagnostic analysis component.

FIG. 7 is a diagram of example operations 700 capable of being performed by diagnostic analysis component 530. Diagnostic analysis component 530 may include the features described above in connection with, for example, one or more of FIGS. 1, 5, and 6. As illustrated in FIG. 7, diagnostic output component 610 may receive request 660 for a diagnostic class from a tester. In one example, request 660 for a diagnostic class may include an array 710. Array 710 may include multiple diagnostics to be performed on TCE code 540 during a diagnostic analysis. For example, array 710 may include a request for an in-depth analysis of the failure of TCE code 540, a request to gather information on active processes during the failure of TCE code 540, a request to obtain a screen shot during the failure of TCE code 540, a request to save information associated with the failure of TCE code 540, etc.

Diagnostic output component 610 may receive array 710, and may perform the multiple diagnostics of array 710 on TCE code 540 (e.g., when requested by the tester). In one example, diagnostic output component 610 may utilize test information 550 to perform the multiple diagnostics on TCE code 540. Based on performance of the multiple diagnostics, diagnostic output component 610 may output an analysis 720 of the failure of TCE code 540, active processes 730 occurring during the failure of TCE code 540, a screen shot 740 during the failure of TCE code 540, information 750 associated with the failure of TCE code 540, etc. Analysis 720 of the failure of TCE code 540 may include an in-depth analysis of the failure of TCE code 540 (e.g., "The failure occurred because incorrect variables are input into an equation . . . "). Active processes 730 may include a status of a device on which TCE code 540 is executing, state information associated with models at the point of the failure, processes of TCE code 540 that are executing during the failure (e.g., "Active processes include execution of the function(t) . . . "), etc. Screen shot 740 may include a screen shot of the executing TCE code 540 during the failure. Failure information 750 may include information associated with the failure of TCE code 540.

Although FIG. 7 shows example operations capable of being performed by diagnostic analysis component 530, in other implementations, diagnostic analysis component 530 may perform fewer operations, different operations, and/or additional operations than depicted in FIG. 7. Alternatively, or additionally, one or more components of FIG. 7 may perform one or more other tasks described as being performed by one or more other components of FIG. 7.

Figure 8:
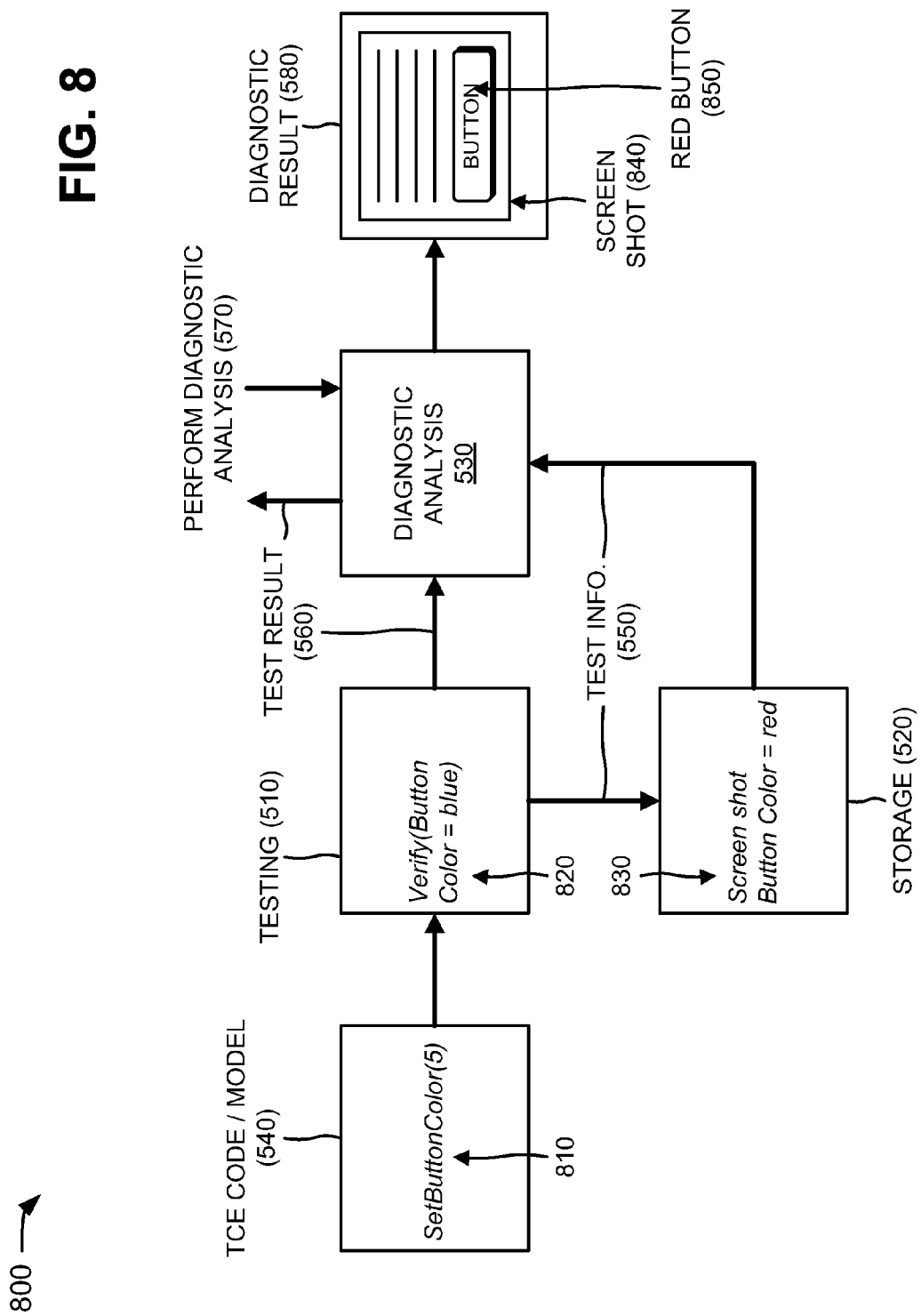
FIG. 8 is a diagram of example operations capable of being performed by the TCE.

FIG. 8 is a diagram of further example operations 800 capable of being performed by TCE 240. TCE 240 may include the features described above in connection with, for example, one or more of FIGS. 1 and 5-7. As shown in FIG. 8, testing component 510 may receive TCE code 540 generated by TCE 240. In one example, TCE code 540 may include syntax 810 (e.g., SetButtonColor(5)) that needs to be verified by testing component 510.

Testing component 510 may receive (e.g., from a tester) a test to perform on TCE code 540. In one example, the test may include syntax 820 (e.g., Verify(Button Color=blue)) that verifies whether a button color, displayed by TCE code 540, is blue. Testing component 510 may perform the test on TCE code 540 to generate test result 560. In one example, test result 560 may include an indication (e.g., a diagnostic string) that provides a static explanation of whether or not the button color, displayed by TCE code 540, is blue. During performance of the test on TCE code 540, testing component 510 may generate test information 550, and may provide test information 550 to storage component 520. Storage component 520 may receive and store test information 550. In one example, test information 550 may include information 830 associated with a screen shot generated by TCE code 540 when the button is displayed. In this example, information 830 associated with the screen shot may indicate that the button color is red, which may indicate that TCE code 540 failed the test.

Testing component 510 may output (e.g., display to the tester) and/or may store test result 560 (e.g., in storage component 520). Alternatively, or additionally, testing component 510 may provide test result 560 to diagnostic analysis component 530. Diagnostic analysis component 530 may receive test result 560, and may provide (e.g., display) test result 560 to the tester. Based on test result 560 (e.g., which indicates that TCE code 540 failed the test), the tester may provide request 570, to perform the diagnostic analysis, to diagnostic analysis component 530.

If diagnostic analysis component 530 receives request 570 to perform the diagnostic analysis, diagnostic analysis component 530 may retrieve test information 550 from storage component 520. Diagnostic analysis component 530 may perform, based on request 570 and test information 550, a diagnostic analysis of TCE code 540 to generate diagnostic result 580. In one example, diagnostic result 580 may include a screen shot 840 of the executing TCE code 540 during the failure. As shown in FIG. 8, screen shot 840 may include a red button 850 rather than the desired blue button. Diagnostic analysis component 530 may output (e.g., display to the tester) and/or may store screen shot 840 with red button 850. Such an arrangement may enable the tester to see the incorrect red button 850 first hand, rather than merely a static diagnostic failure string.

Although FIG. 8 shows example operations capable of being performed by TCE 240, in other implementations, TCE 240 may perform fewer operations, different operations, and/or additional operations than depicted in FIG. 8. Alternatively, or additionally, one or more components of FIG. 8 may perform one or more other tasks described as being performed by one or more other components of FIG. 8.

Example Process

Figure 9:
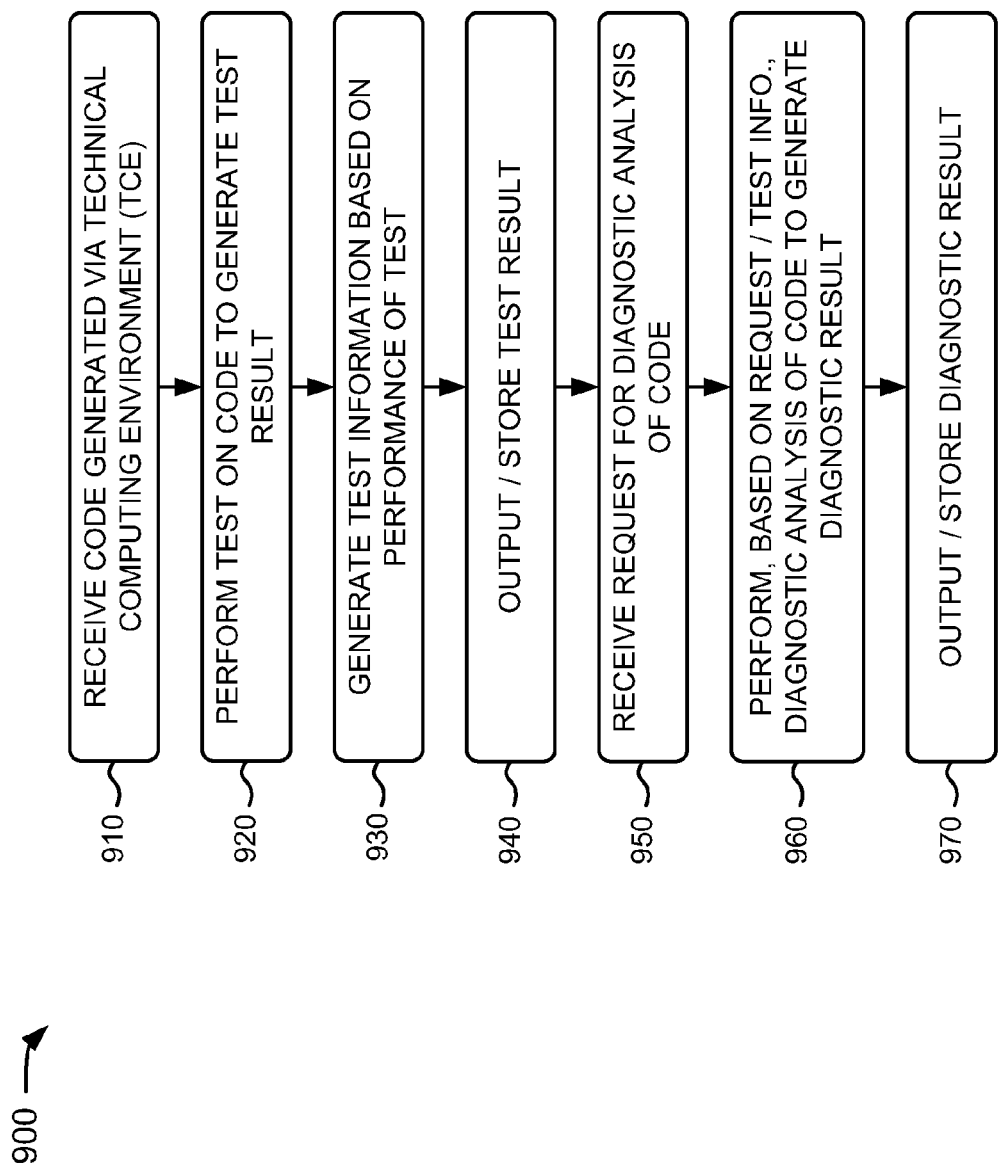
FIGS. 9 and 10 are flow charts of an example process for deferred evaluation and presentation of a custom diagnostic analysis.
Figure 10:
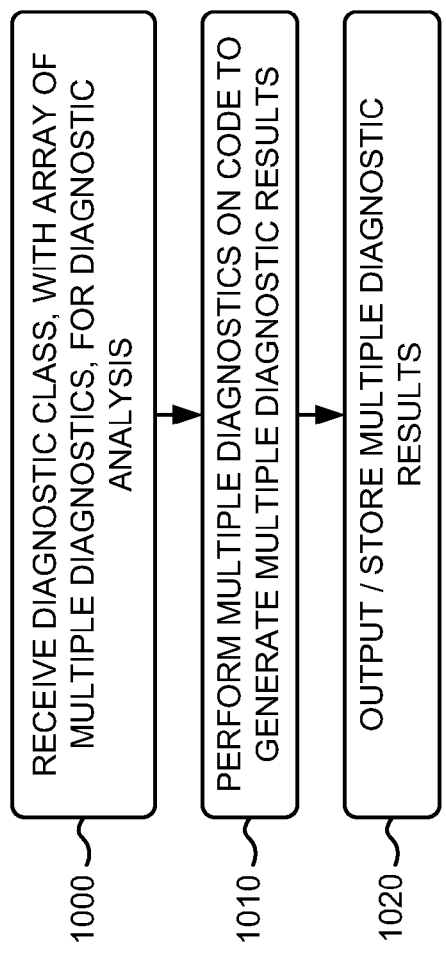

FIGS. 9 and 10 are flow charts of an example process 900 for deferred evaluation and presentation of a custom diagnostic analysis. In one implementation, process 900 may be performed by client device 210/TCE 240. Alternatively, or additionally, process 900 may be performed by another device or a group of devices separate from or including client device 210/TCE 240.

As shown in FIG. 9, process 900 may include receiving code generated via a technical computing environment (TCE) (block 910), and performing a test on the code to generate a test result (block 920). For example, in an implementation described above in connection with FIG. 5, testing component 510 may receive code 540 generated by TCE 240. TCE code 540 may include text-based code that may require further processing to execute, binary code that may be executed, text files that may be executed in conjunction with other executables, etc. Testing component 510 may receive (e.g., from a tester) a test to perform on TCE code 540. Testing component 510 may perform the test on TCE code 540 to generate test result 560. In one example, test result 560 may include an indication (e.g., a diagnostic string) that provides a static explanation of whether one or more portions of TCE code 540 passed or failed the test.

As further shown in FIG. 9, process 900 may include generating test information based on performance of the test (block 930), and outputting and/or storing the test result (block 940). For example, in an implementation described above in connection with FIG. 5, during performance of the test on TCE code 540, testing component 510 may generate test information 550, and may provide test information 550 to storage component 520. In one example, test information 550 may include states of TCE code 540 during execution of the portions of TCE code 540, information associated with screen shots of the executing TCE code 540, information associated with failures of TCE code 540, etc. Testing component 510 may output (e.g., display to the tester) and/or may store test result 560 (e.g., in storage component 520).

Returning to FIG. 9, process 900 may include receiving a request for a diagnostic analysis of the code (block 950), performing, based on the request and the test information, a diagnostic analysis of the code to generate a diagnostic result (block 960), and outputting and/or storing the diagnostic result (block 970). For example, in an implementation described above in connection with FIG. 5, based on test result 560, the tester may or may not decide to perform a diagnostic analysis on TCE code 540. If the tester decides to perform the diagnostic analysis on TCE code 540, the tester may provide a request 570, to perform the diagnostic analysis, to diagnostic analysis component 530. If diagnostic analysis component 530 receives request 570 to perform the diagnostic analysis, diagnostic analysis component 530 may retrieve test information 550 from storage component 520. Diagnostic analysis component 530 may perform, based on request 570 and test information 550, a diagnostic analysis of TCE code 540 to generate diagnostic result 580. In one example, diagnostic result 580 may include a diagnostic string, an in-depth analysis of a failure in TCE code 540, active processes during occurrence of the failure in TCE code 540, a screen shot of the executing TCE code 540 during the failure, information associated with the failure, etc. Diagnostic analysis component 530 may output (e.g., display to the tester) and/or may store diagnostic result 580.

Process blocks 960/970 may include the process blocks depicted in FIG. 10. As shown in FIG. 10, process blocks 960/970 may include receiving a diagnostic class, with an array of multiple diagnostics, for the diagnostic analysis (block 1000), performing the multiple diagnostics on the code to generate multiple diagnostic results (block 1010), and outputting and/or storing the multiple diagnostic results (block 1020). For example, in an implementation described above in connection with FIG. 5, diagnostic analysis component 530 may receive a diagnostic class for the diagnostic analysis. The diagnostic class may include an array of multiple diagnostics to perform on TCE code 540. In one example, the diagnostic class may include particular syntax (e.g., diagnostic.join (diag1, diag2, . . . , diagn)) for the array, where diag1 through diagn may include strings, function handles, and/or diagnostic instances. Diagnostic analysis component 530 may perform the multiple diagnostics on TCE code 540 to generate multiple diagnostic results. Diagnostic analysis component 530 may output (e.g., display to the tester) and/or may store the multiple diagnostic results.

CONCLUSION

Systems and/or methods described herein may defer evaluation and presentation of a custom diagnostic analysis. In one example, the systems and/or methods may provide a rich diagnostic infrastructure that is flexible and customizable. The systems and/or methods may enable a tester to create a custom diagnostic that performs an in-depth and complete diagnostic analysis of a state of program code, when requested by the tester. For example, the tester may request the diagnostic analysis of the code when the code fails or when the code passes (i.e., does not fail). Thus, the systems and/or methods may enable the diagnostic analysis to be deferred until the tester requests the diagnostic analysis. Such an arrangement may prevent the diagnostic analysis from unnecessarily consuming time and costly computing resources.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 9 and 10, the blocks and/or the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
one or more processors to:
perform a test on code to generate a test result,
the test testing whether the code will function as intended when executed,
the test result including an indication indicating whether the code passed or failed the test, generate test information during performing the test on the code,
the test information including additional information compared to information contained in the test result, the additional information being associated with the test result,
store the test information in association with the test result,
receive a request for performing a diagnostic analysis of the code,
the request containing information about a customized method or a selected method for performing the diagnostic analysis and information about a test result of interest, provide an option to a tester for the tester to select from among a plurality of methods for performing the diagnostic analysis of the code and to specify diagnostic information to be generated from the diagnostic analysis, perform the diagnostic analysis of the code based on the request and the test information, performing the diagnostic analysis including applying the customized method or the selected method on the stored test information to generate the diagnostic information about the test result of interest, the diagnostic analysis being different than the test, and provide the diagnostic information to the tester.

2. The device of claim 1, where the one or more processors, when performing the diagnostic analysis, are further to:

apply the customized method or the selected method to generate multiple diagnostic results, the multiple diagnostic results including the diagnostic information, and where the one or more processors are further to:

output or store the multiple diagnostic results.

3. The device of claim 1, where the request for the diagnostic analysis is received when the test result indicates that the code failed the test.

4. The device of claim 1, where the diagnostic analysis includes one or more of:

an analysis of a failure associated with the code, a determination of active processes of the code during occurrence of the failure associated with the code, a screen shot produced by the code during the failure associated with the code, or a determination of information associated with the failure.

5. The device of claim 1, where the test result includes a diagnostic string that indicates whether the code passed or failed the test.

6. The device of claim 1, where the test information includes one or more of:

a state of the code during execution of the code, information associated with screen shots during execution of the code, or information associated with failures of the code.

7. The device of claim 1, where the one or more processors are further to:

prevent the performance of the diagnostic analysis of the code when the request is not received.

8. The device of claim 1, where the one or more processors, when performing the diagnostic analysis, are further to:

perform the diagnostic analysis when the indication in the test result indicates the code passed the test.

9. A method, comprising:

performing a test on code to generate a test result, the test testing whether the code will function as intended when executed, the test result including an indication indicating whether the code passed or failed the test, the performing the test being performed by one or more devices; generating test information during performing the test on the code, the generating the test information being performed by the one or more devices;

receiving a request for a diagnostic analysis of the code, the request containing information about a customized method or a selected method for performing the diagnostic analysis and information about a test result of interest, the receiving the request being performed by the one or more devices;

providing an option to a tester for the tester to select from among a plurality of methods for performing the diagnostic analysis of the code and to specify diagnostic information to be collected from the diagnostic analysis, the providing the option being performed by the one or more devices;

performing the diagnostic analysis of the code based on the request and the test information, performing the diagnostic analysis including applying the customized method or the selected method on the stored test information to generate the diagnostic information about the test result of interest, the diagnostic analysis being different than the test, the performing the diagnostic analysis being performed by the one or more devices; and providing the diagnostic information to the tester, the providing the diagnostic information being performed by the one or more devices.

10. The method of claim 9, where the request for the diagnostic analysis is received when the test result indicates that the code failed the test.

11. The method of claim 9, where the test result includes a diagnostic string that indicates whether the code passed or failed the test.

12. The method of claim 9, where the test information includes one or more of:

a state of the code during execution of the code, information associated with screen shots during execution of the code, or information associated with failures of the code.

13. The method of claim 9, where the diagnostic information identifies a problem causing a failure in the code.

14. The method of claim 9, where the diagnostic information includes information associated with a debugging process for debugging the code.

15. The method of claim 9, where the diagnostic information includes a diagnostic string that provides a static explanation of a failure in the code.

16. The method of claim 9, where the diagnostic information includes a result of executing a function handle.

17. The method of claim 9, where performing the diagnostic analysis further comprises:

performing the diagnostic analysis when the indication in the test result indicates the code passed the test.

18. One or more non-transitory computer-readable media, comprising:

one or more instructions that, when executed by a processor of a device, cause the processor to:

perform a test on code to generate a test result, the test testing whether the code will function as intended when executed, the test result including an indication indicating whether the code passed or failed the test, generate test information during performing the test on the code, the test information including additional information compared to information contained in the test result, the additional information being associated with the test result, receive a request for performing a diagnostic analysis of the code, the request containing information about a customized method or a selected method for performing the diagnostic analysis and information about a test result of interest, provide an option to a tester for the tester to select from among a plurality of methods for performing the diagnostic analysis of the code and to specify diagnostic information to be obtained from the diagnostic analysis, perform the diagnostic analysis of the code based on the request and the test information, performing the diagnostic analysis including applying the customized method or the selected method on the test information to generate the diagnostic information about the test result of interest, the diagnostic analysis being different than the test, and provide the diagnostic information to the tester.

19. The non-transitory computer-readable media of claim 18, where the request contains information about the customized method, and where the customized method is applied to the test information.

20. The non-transitory computer-readable media of claim 18, where the request contains information about the selected method, and where the selected method is applied to the test information.

\* \* \* \* \*